United States Patent [19]
Shinoda et al.

[11] Patent Number: 5,698,918
[45] Date of Patent: Dec. 16, 1997

[54] SMALL DC MOTOR HAVING A SHIELD BAND

[75] Inventors: Takeshi Shinoda, Chofu; Nobuyuki Nakagome, Musashino, both of Japan

[73] Assignee: Mitsumi Electric Co., Ltd., Tokyo, Japan

[21] Appl. No.: 627,145

[22] Filed: Apr. 3, 1996

[30] Foreign Application Priority Data

Apr. 28, 1995 [JP] Japan .................. 7-128864

[51] Int. Cl.$^6$ .................................. H02K 5/00
[52] U.S. Cl. .................. 310/89; 310/256; 310/85; 310/114
[58] Field of Search .................. 310/256, 114, 310/85, 89, 40 MM; 336/84 C, 82, 73, 84 M, 90

[56] References Cited

U.S. PATENT DOCUMENTS

| | | | |
|---|---|---|---|
| 2,859,337 | 11/1958 | Rietveld | 336/90 |
| 3,873,995 | 3/1975 | Schober | 360/137 |
| 3,874,418 | 4/1975 | Hielema | 138/144 |
| 4,806,400 | 2/1989 | Sancaktar | 428/35.9 |
| 5,313,126 | 5/1994 | Forsythe et al. | 310/51 |
| 5,565,272 | 10/1996 | Masui et al. | 428/432 |

*Primary Examiner*—Steven L. Stephan
*Assistant Examiner*—Timothy A. J. Williams
*Attorney, Agent, or Firm*—Morrison Law Firm

[57] ABSTRACT

A shield band, made from grain-oriented silicon metal, is wrapped about a case of a motor to reduce electromagnetic emissions. The case is protected by a strip of tape adhered to an outer surface of the case. The shield band is made by pressing a strip of metal against a strip of tape with an adhesive agent between them. The resulting strip is cut to length and curled around a roller to form a band which conforms to the outer perimeter of the small D.C. motor. A plate bridges the facing ends of the shield band.

4 Claims, 3 Drawing Sheets

Prior Art

SMALL DC MOTOR HAVING A SHIELD BAND

BACKGROUND OF THE INVENTION

The present invention relates to a small D.C. motor around which is wrapped a shield band. In particular, the present invention relates to the structure of a shield band having a rust or oxidation-preventing tape attached to the surface of a band-shaped metal plate, and a method for making such a shield band.

Shield bands are used on small D.C. motors to reduce the radiation of electromagnetic fields from D.C. motors generated inside small D.C. motors during operation of the motors. Some circuits, which may be located near the small D.C. motor, are susceptible to electromagnetic interference caused by the electromagnetic fields. In addition, although tests have failed to confirm it, there is at least a perceived health hazard associated with long term exposure to electromagnetic radiation. The shield bands, by reducing the radiation of electromagnetic fields, allow small D.C. motors to be mounted closer to circuits without detrimentally affecting the circuits, thereby facilitating a reduction in size of the devices in which the small D.C. motors are used. The shield bands also lower the perceived risk of exposure to electromagnetic radiation for anyone who happens to be in the vicinity of the small D.C. motor.

The most effective material for the shield bands is metal. However, metals oxidize or rust which reduces the useful life of the shield band. According to the prior art, to prevent oxidation, or rusting, of the shield band, a layer of paint is applied to an exposed portion of the shield band.

Referring to FIG. 4, a small DC motor, shown generally at 100, has a prior art magnetic shield band 101 wrapped around a motor case 102. A rotating shaft 103 extends from one end of motor case 102. The metallic magnetic shield band 101 is wrapped around the outer perimeter of motor case 102 to prevent electrical and magnetic noise generated within motor case 102 from radiating outward. Paint on the outer surface of the shield plate of shield band 101 to inhibits the formation of rust, or other oxidation, on the shield band. The entire assembly is then baked in a furnace to strengthen the bond of the paint to the shield plate of shield band 101, extending the useful life of the small D.C. motor.

However, the method of applying paint for rust prevention to a magnetic shield band surface having a structure as defined above requires a complex process. In addition to the assembly process of the motor, the method of applying the rust prevention includes painting and baking. Each of these additional processes requires a separate piece of large-scale equipment. The installation of these separate pieces of equipment requires a large area. Production of the necessary equipment is also complicated.

The shield bands made according to this prior art method are expensive. Consequently, small D.C. motors fitted with these bands are expensive as well.

OBJECT AND SUMMARY OF THE INVENTION

It is an object of the present invention to provide a signal D.C. motor having a shield band which overcomes the drawbacks of the prior art described above.

It is also an object of the present invention to provide a small D.C. motor having a shield band wherein the shield band is a band-shaped metal plate that is easily formed.

It is also an object of the present invention to provide a signal DC motor having a shield band wherein the process for applying a rust inhibitor is performed easily and inexpensively.

Briefly, a shield band, made from grain-oriented silicon metal, is wrapped about a case of a motor to reduce electromagnetic emissions. The case is protected by a strip of tape adhered to an outer surface of the case. The shield band is made by pressing a strip of metal against a strip of tape with an adhesive agent between them. The resulting strip is cut to length and curled around a roller to form a band which conforms to the outer perimeter of the small D.C. motor. A plate bridges the facing ends of the shield band.

According to an embodiment of the present invention, there is disclosed, a motor comprising: a generally cylindrical motor case, a metal shield band, said metal shield band being shaped to fit an outer perimeter of said motor case, said metal shield band extending substantially less than an entire circumference of said motor case, whereby a space exists between adjacent ends of said metal shield band, a protective tape covering substantially an entire outer surface of said metal shield band, an adhesive layer adhering an inner surface of said protective tape to an outer surface of said metal shield band, whereby said metal shield band is protected, and a plate bridging said space, whereby said metal shield is fixed in place on said motor case.

According to another embodiment of the present invention, there is disclosed, a method for making shield bands comprising: feeding a continuous tape strip and a continuous metal strip through a guide, maintaining an alignment of said continuous tape strip and said continuous metal strip, coating a facing surface of one of said continuous metal strip and said continuous tape strip with an adhesive, pressing said continuous tape strip against said continuous metal strip with said adhesive between them to adhere said continuous tape strip to said continuous metal strip to form a continuous shield strip, cutting a predetermined length of said continuous shield strip to form a shield section, and wrapping said shield section around a shield roller to form a perimeter having a predetermined diameter.

According to yet another embodiment of the present invention, there is disclosed, a method for making shield bands comprising: clamping a strip of tape and a strip of metal between two chucks, transporting said chucks with said strip of tape and said strip of metal toward a shield roller until a leading edge of said strip of tape and said strip of metal is held between said shield roller and a passive roller held against said shield roller, cutting said strip of tape and said strip of metal at a predetermined length from said leading edge to form a shield section, rotating said shield roller, and pressing said shield section against said shield roller with at least two passive rollers as said shield roller rotates to form a perimeter having a predetermined diameter.

In one embodiment of the invention, a tape is affixed to the surface of a band-shaped metal plate, thus allowing adhesion to be performed with simple equipment and providing an inexpensive shield band. This makes it possible to inexpensively produce a small D.C. motor equipped with this shield band.

In another embodiment of the invention, polyester is used for the tape affixed to the surface of the band-shaped metal plate. This polyester has a low thickness dimension and is also inexpensive. This makes it possible to produce a thin, inexpensive shield band.

In still a further embodiment of the invention, rollers are used to affix the band-shaped shield plate and the tape together with pressure. The shield plate and tape are then cut to a prescribed length, and curled with another roller. Thus, production is performed easily with simple equipment.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
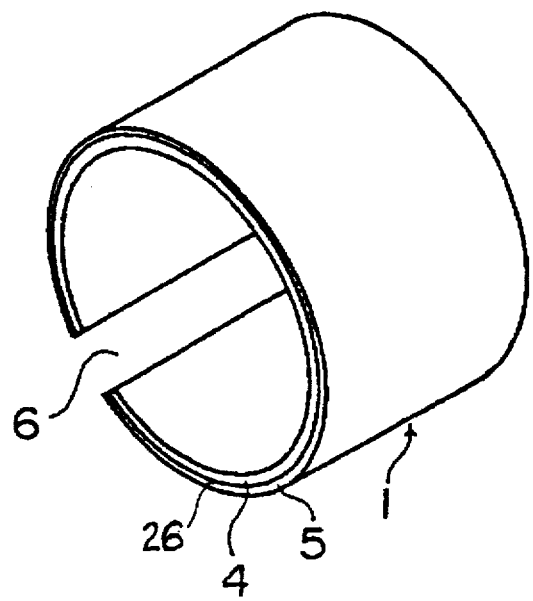
FIG. 1 is a perspective drawing showing a shield band according to one embodiment of the present invention.

Referring to FIG. 1, a shield band 1 includes a band-shaped metal plate 4. Metal plate 4 is made from a grain-oriented silicon steel. A space 6 exists between two ends thereof. A tape 5 contains an adhesive agent 26 on an inner surface of tape 5. Adhesive agent 26 is applied to an outer surface of metal plate 4 to adhere tape 5 thereto. The presence of tape 5 inhibits the formation of rust or oxidation on the outer surface of metal plate 4. Tape 5 is made of polyester with a thickness of approximately 0.05 mm. The outer diameter of a small D.C. motor having shield band 1 wrapped around its perimeter is minimized because tape 5 is thin. A thin tape 5 has the advantage of being difficult to peel off metal plate 4. Tape 5 being made from polyester also has the advantage of being inexpensive, making shield band 1 an inexpensive component. The production cost of the motor using shield band 1 is consequently lowered as well.

Figure 2:
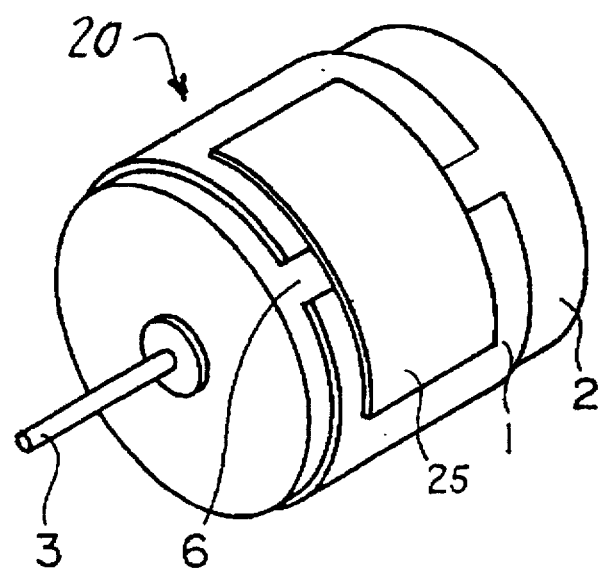
FIG. 2 is a perspective drawing showing a motor equipped with the shield band of the present invention shown in FIG. 1.

Referring to FIG. 2, a small DC motor 20 includes a motor case 2. A rotating shaft 3 extends axially from motor case 2. Shield band 1 is wrapped around an outer perimeter of motor case 2 substantially concentric with rotating shaft 3. Shield band 1 is fixed to an outer perimeter of motor case 2 using any suitable adhesive such as, for example, Cemedine. A plate 25 overlaps the spaced ends of shield band 1, thus bridging space 6. Plate 25 is roughly centered at space 6, between the ends of shield band 1. Plate 25 may conveniently serve as a nameplate on which is imprinted operational stats of small D.C. motor 20 such as for example the model number, operating voltage, operating current, and coil resistances.

Figure 3:
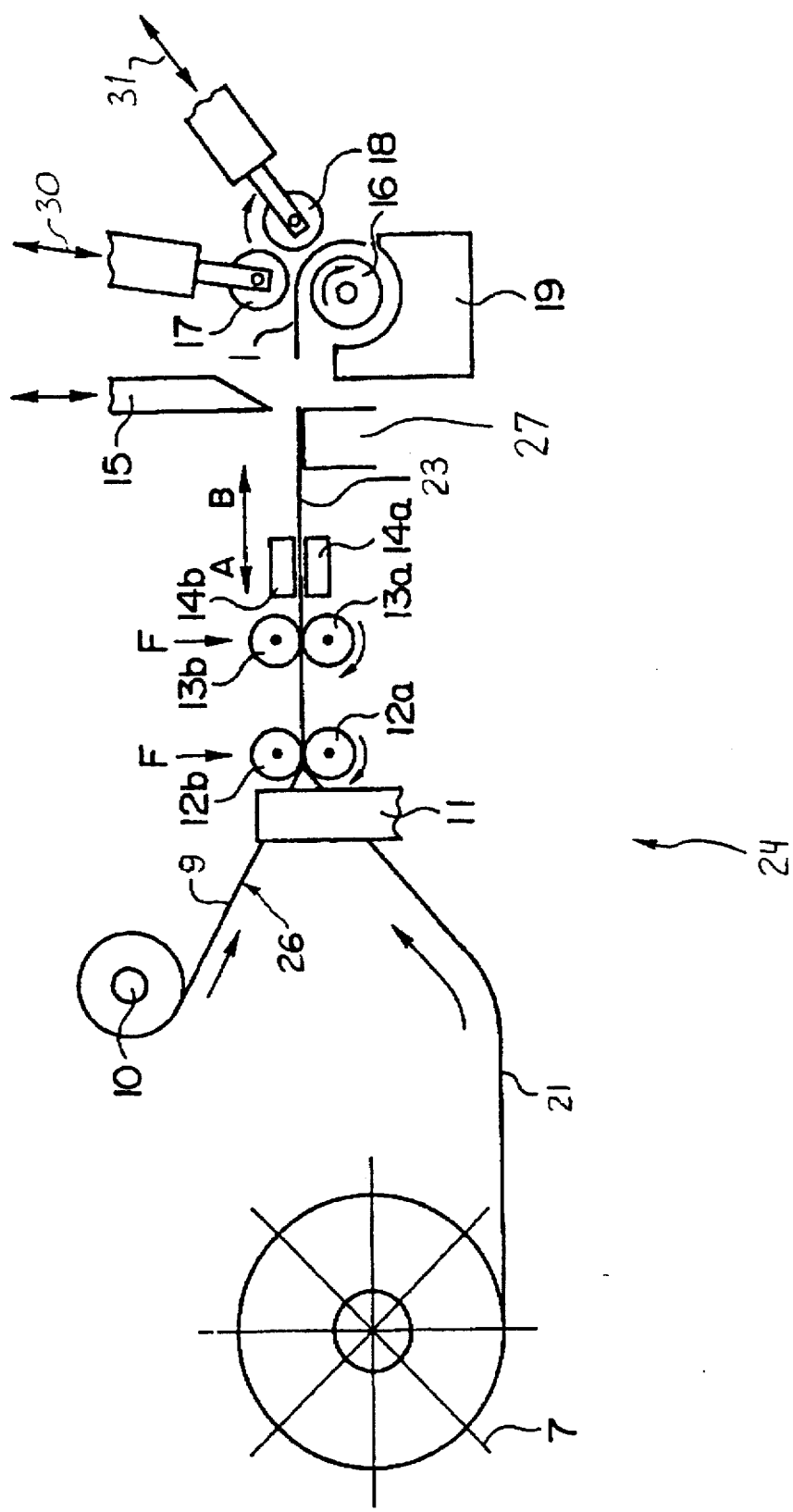
FIG. 3 is a process diagram showing a process for producing the shield band of the present invention.
Figure 4:
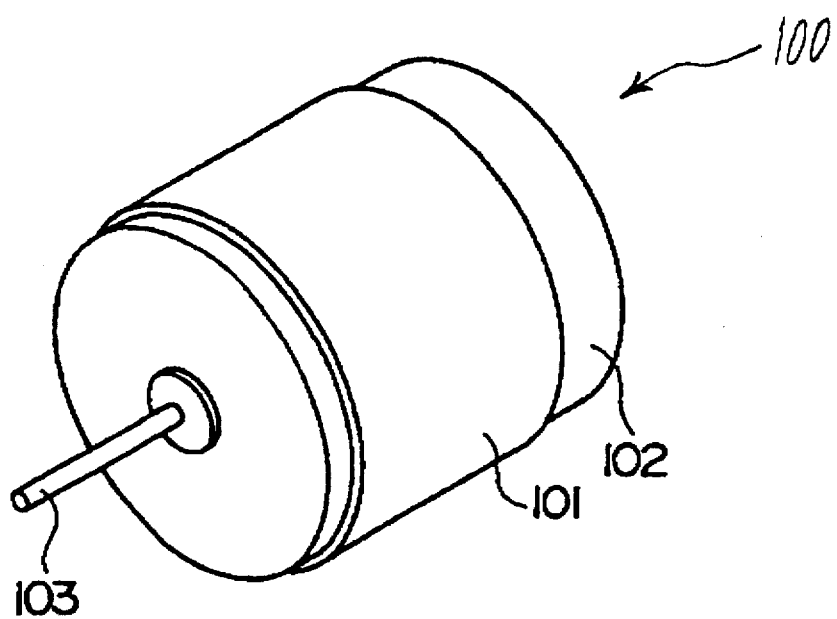
FIG. 4 is a perspective drawing showing a motor equipped with a prior art shield band.

Referring to FIG. 3, a device for manufacturing a shield band 24 includes a reel 7 for supporting a continuous strip of metal 21 and a reel 10 for supporting a continuous strip of tape 9. Continuous strip of metal 21 is made of grain-oriented silicon steel. Continuous strip of tape 9 is made of polyester. Continuous strip of tape 9 also includes adhesive agent 26 applied on the side of continuous strip of tape 9 facing continuous strip of metal 21. Continuous strip of metal 21 and continuous strip of tape 9 are fed from reel 7 and reel 10, respectively, toward a guide 11. Guide 11 maintains positions of continuous strip of metal 21 and continuous strip of tape 9 transversely aligned as they pass through guide 11 such that continuous strip of tape 9 is accurately applied onto continuous strip of metal 21 to form a continuous strip of shield 23.

The stacked continuous strip of metal 21 and continuous strip of tape 9 then pass through rollers 12a and 12b. Rollers 12a and 12b are forced together. Adhesive agent 26 causes continuous strip of tape 9 to adhere to continuous strip of metal 21 under the pressure applied to continuous strip of metal 21 and continuous strip of tape 9 by rollers 12a and 12b. After the continuous strip of metal 21 and continuous strip of tape 9 pass through rollers 12a and 12b, they pass through rollers 13a and 13b which similarly apply pressure to continuous strip of metal 21 and the continuous strip of tape 9 for further adhesion. This portion of production processes is referred to as the adhesion process.

As continuous strip of metal 21 and continuous strip of tape 9 are fed through rollers 13a and 13b, they emerge as a continuous strip of shield 23. At the output of rollers 13a and 13b, continuous strip of shield 23 is clamped by chucks 14a and 14b. Chucks 14a and 14b transport continuous strip of shield 23 a fixed distance forward in a direction B for a length roughly equal to the outer perimeter dimension of motor case 2 (not shown in FIG. 3). Movement of chucks 14a and 14b is then halted. In other words, continuous strip of shield 23 is transferred for a prescribed length roughly equal to the outer perimeter dimension of small D.C. motor 20 (not shown in FIG. 3). A leading portion of continuous strip of shield 23 travels on an anvil 27 as it is moved in direction B. After being transported, a leading end of continuous strip of shield 23 rests on a roller 16. A roller 17 descends toward continuous strip of shield 23 until continuous strip of shield 23 is held between roller 17 and roller 16. This series of production processes is referred to as the process for transferring continuous strip of shield 23.

A cutter 15 descends from above to cut the portion of continuous shield band 23 that has been transported a prescribed length against an edge of anvil 27. The resulting piece is shield band 1 (also shown in FIGS 1 and 2). When the cut is completed, chucks 14a and 14b release their hold of continuous strip of shield 23 and return to an initial position in a direction A. Likewise cutter 15 returns to its initial position. This series of processes is referred to as the process for cutting shield band 1.

After cutting, roller 16 rotates to transport shield band 1, between rollers 16 and 17. When the leading end of shield band 1, initially interposed between roller 16 and 17, reaches the vicinity of a roller 18, roller 18 moves towards roller 16, bending the leading end of shield band 1 toward roller 16. As shield band 1 is transported by roller 16, the entire length of shield band 1 is pressed against the outer perimeter of roller 16 by rollers 17 and 18. Shield band 1 is shaped to roughly the same diameter as the outer perimeter curvature of roller 16. Once a trailing end of shield band 1, which was recently cut by cutter 15, passes through rollers 16 and 17, the rotation of roller 16 stops and rollers 17 and 18 retract from roller 16 to their respective initial positions (in the direction indicated by an arrows 30 and 31). Shield band 1 is now in the curved shape of shield band 1 as shown in FIG. 1.

A guide 19 moves forward (ie. out of the plane of FIG. 3) carrying shield band 1 from device 24. Shield band 1 is removed from device 24. The shaping of shield band 1 is performed easily because of the positioning of rollers 16–18 described above. This series of production processes is referred to as the curling process.

The above described production process is performed essentially with a simple combination of reels 7 and 10, around which continuous strip of metal 21 and continuous strip of tape 9 are respectively wrapped, rollers 12a, 12b, 13a, and 13b, chucks 14a and 14b, cutter 15, and rollers 16–18. Device 24 takes little space. In one embodiment, device 24 has an approximate dimension of 1.5 m height, 2 m width and 0.5 m depth. In addition, device 24 is the only machine required to produce a complete shield band 1 as opposed to the several different devices of the prior art wherein each device performs only one part of the process.

In the curling process described above, the curling diameter of shield plate 1 is easily changed by replacing roller 16 with a roller having a different diameter. This allows the curling diameter to match different motor diameters. Also, the curling process is performed using an extremely simple configuration of a minimal number of members: roller 16, and the two rollers 17 and 18 that press against roller 16. Lastly, curve shaped shield band 1 is removed very easily by simply moving guide 19 forward.

Therefore, compared to prior art shield bands described above, the present invention decreases production costs of a shield band to approximately one-tenth the cost of the prior art shield band.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A motor comprising:

a generally cylindrical motor case;

a metal shield band;

said metal shield band being shaped to fit an outer perimeter of said motor case;

said metal shield band extending substantially less than an entire circumference of said motor case, whereby a space exists between adjacent ends of said metal shield band;

a polyester protective tape covering substantially an entire outer surface of said metal shield band;

an adhesive layer adhering an inner surface of said protective tape to an outer surface of said metal shield band, whereby said metal shield band is protected; and a plate bridging said space and fixedly connecting said adjacent ends of said metal shield band, whereby said metal shield band is fixed in place on said motor case.

2. A motor comprising:

a generally cylindrical motor case;

a metal shield band;

said metal shield band being shaped to fit an outer perimeter of said motor case;

said metal shield band extending substantially less than an entire circumference of said motor case, whereby a space exists between adjacent ends of said metal shield band;

a protective tape covering substantially an entire outer surface of said metal shield band;

an adhesive layer adhering an inner surface of said protective tape to an outer surface of said metal shield band, whereby said metal shield band is protected;

a plate bridging said space and fixedly connecting said adjacent ends of said metal shield band, whereby said metal shield band is fixed in place on said motor case; and said metal shield band being grain-oriented silicon steel.

3. A motor comprising:

a generally cylindrical motor case;

a metal shield band;

said metal shield band being shaped to fit an outer perimeter of said motor case;

said metal shield band extending substantially less than an entire circumference of said motor case, whereby a space exists between adjacent ends of said metal shield band;

a polyester protective tape covering substantially an entire outer surface of said metal shield band;

an adhesive layer adhering an inner surface of said protective tape to an outer surface of said metal shield band, whereby said metal shield band is protected;

a plate bridging said space and fixedly connecting said adjacent ends of said metal shield band, whereby said metal shield band is fixed in place on said motor case; and said metal shield band, said adhesive layer, and said protective tape are cut from a longitudinal strip of a laminate of said metal shield band, said adhesive layer, and said protective tape.

4. The motor of claim 3, wherein said metal shield band, said adhesive layer, and said protective tape cut from said longitudinal strip are shaped to fit said outer perimeter of said motor case by being pressed about a cylindrical roller.

* * * * *